A. BERRY.
HOLLOW AUGER.
No. 173,885.  Patented Feb. 22, 1876.
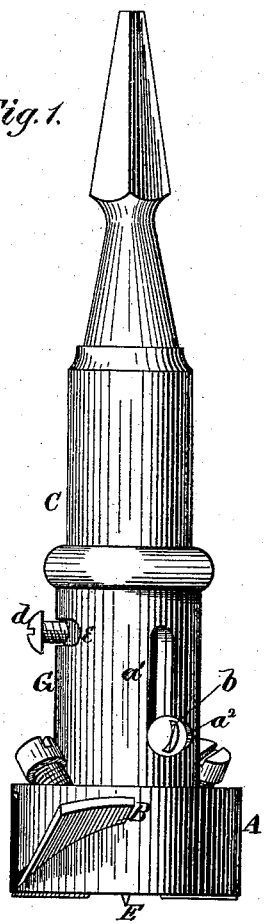
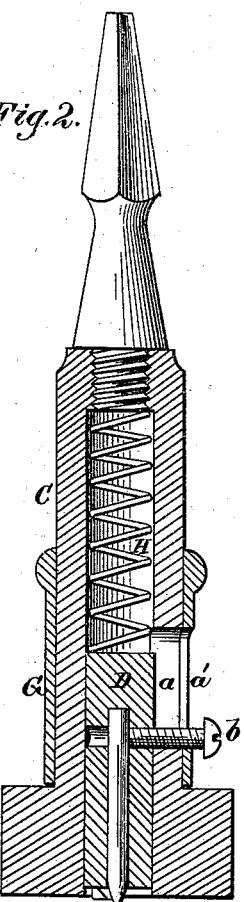
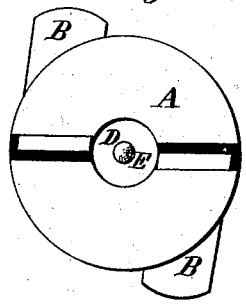

United States Patent Office.

AUSTIN BERRY, OF WATERLOO, CANADA.

IMPROVEMENT IN HOLLOW AUGERS.

Specification forming part of Letters Patent No. 173,885, dated February 22, 1876; application filed December 31, 1875.

*To all whom it may concern:*

Be it known that I, AUSTIN BERRY, of Waterloo, in the Province of Quebec, Canada, have invented certain new and useful Improvements in Hollow Augers; and do hereby declare that the following is a full, clear, and exact description thereof, reference being had to the accompanying drawings and to the letters of reference marked thereon, making a part of this specification.

The nature of my invention consists in the construction and arrangement of a hollow auger, as will be hereinafter more fully set forth.

In order to enable others skilled in the art to which my invention appertains to make and use the same, I will now proceed to describe its construction and operation, referring to the annexed drawing, in which—

Figure 1 is a side elevation of my invention. Fig. 2 is a longitudinal section of the same, and Fig. 3 is an end view thereof.

My invention is intended principally for the hollow augers used by carriage-makers to make tenons on spokes. With the augers now generally used for this purpose the operator is obliged to fetch the end of the spoke to a point, or make it small enough to enter the mouth of the auger, in order to have the auger work, as it is impossible to get the auger to start unless the spoke is first pointed so as to enter the mouth of the auger.

A represents the head of the auger, in which the knives or bits B B are fastened in the usual manner. C is the tubular shank or stem of the auger, the center bore of which extends through the head A. Inside the auger is placed a sliding plunger, D, in the front or outer end of which is placed a pointed center, E. Through the shank C, directly above the knife-head A, is cut a longitudinal slot, $a$, through which a screw, $b$, is passed into the sliding plunger D, and against the pointed center E, to hold the same firmly in place. The center E can be moved in or out, as required, it being necessary for the center to be farther out for soft wood than for hard. Around the shank C is placed an exterior sleeve, G, through which is cut a slot $a^1$, corresponding with the slot $a$ in the stem C, and the screw $b$ passes through said slot $a^1$ also. At the front or outer end of the slot $a^1$ is cut another slot, $a^2$, at right angles therewith, so that by turning the sleeve G to cause the screw $b$ to enter said slot $a^2$ the sliding plunger D will be locked and held stationary at the mouth of the auger, which is necessary until the auger is fully started on the tenon. As soon as the auger is started onto the tenon the sleeve G is turned back so that the slots $a$ $a^1$ will correspond, which will allow the sliding plunger to recede as the tenon is formed and passes up the mouth of the auger. To secure the sleeve from sliding back from the knife-head while in the act of holding the center down to its place while the auger is starting, a screw, $d$, is passed through a transverse slot, $e$, in the sleeve, and screws into the stem C, said slot allowing, at the same time, the sleeve to be turned back and forth on the auger. Within the hollow stem C, and in rear of the sliding plunger D, is placed a coiled-wire spring, H, which is designed to be used only when the auger is being used in a lathe, in which case the sleeve G is not supposed to be used to hold the plunger down to its place at the mouth of the auger; but it is not necessary to remove the socket from the auger, but just to turn it, so that the slots $a$ $a^1$ will coincide, and then fasten the sleeve by turning the screw $d$ down tight. When the auger is being used in a bit-stock or turned by hand the spring is designed to be removed, which can be easily done by taking out the screw $b$ that passes through the slots $a$ $a^1$ into the plunger D, and then the plunger will slip out of the mouth of the auger, and then the spring is easily removed.

I do not claim a hollow auger in which a sliding plunger is provided with a center point, when said center point is not adjustable, as I am aware that such is not new.

Having thus fully described my invention, what I claim as new, and desire to secure by Letters Patent, is—

1. In a hollow auger, A B C, I claim a central sliding plunger, D, having an adjustable center point, E, substantially as and for the purposes herein set forth.

2. The combination, with a hollow auger, A B C, of the sliding plunger D, with adjustable center point E, the sleeve G, and the set-screw $b$ passing through slots $a\ a^1$, and bearing against the adjustable point E, all constructed substantially as and for the purpose herein set forth.

In testimony that I claim the foregoing I have hereunto set my hand this 27th day of December, 1875.

AUSTIN BERRY.

Witnesses:
 JOHN FITZGERALD,
 O. P. BLOSS.